US 012147858B2

(12) United States Patent
Dellinger et al.

(10) Patent No.: US 12,147,858 B2
(45) Date of Patent: *Nov. 19, 2024

(54) PAYMENT CARD WITH ENHANCED EDGE PATTERNS

(71) Applicant: Capital One Services, LLC, McLean, VA (US)

(72) Inventors: Timothy Dellinger, Arlington, VA (US); Kavya Nagarajaiah, Herndon, VA (US); Sahana Arya, Edison, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,181

(22) Filed: Jul. 14, 2023

(65) Prior Publication Data

US 2023/0359849 A1 Nov. 9, 2023

Related U.S. Application Data

(63) Continuation of application No. 17/358,712, filed on Jun. 25, 2021, now Pat. No. 11,741,326.

(51) Int. Cl.
*G06K 19/04* (2006.01)
*B32B 3/02* (2006.01)
*G06K 19/07* (2006.01)

(52) U.S. Cl.
CPC .............. *G06K 19/041* (2013.01); *B32B 3/02* (2013.01); *G06K 19/07* (2013.01); *B32B 2425/00* (2013.01)

(58) Field of Classification Search
CPC ........ G06K 19/041; G06K 19/07; B32B 3/02; B32B 2425/00
See application file for complete search history.

(56) References Cited

U.S. PATENT DOCUMENTS

| 4,766,480 | A | 8/1988 | Hamada |
| 4,794,243 | A | 12/1988 | Hamada |
| 5,857,237 | A | 1/1999 | Dranginis |
| 6,248,199 | B1 | 6/2001 | Smulson |
| 6,325,421 | B1 | 12/2001 | Huebner |
| 7,273,234 | B1 | 9/2007 | Collins et al. |
| 9,514,399 | B2 | 12/2016 | Tattersall |

(Continued)

FOREIGN PATENT DOCUMENTS

GB 2 403 182 A 12/2004

*Primary Examiner* — Thien M Le
(74) *Attorney, Agent, or Firm* — Banner & Witcoff, Ltd.

(57) ABSTRACT

Aspects described herein may allow for a payment card having enhanced edge patterns. The payment card may include a complex edge morphology on the physical card that may make the payment card more likely to be used by consumers and makes the payment card stand out due to the enhanced edge design. The edge of the payment card may be reeded, crenelated, or may include various shapes of various sizes on one or more of the edge walls extending around the payment card. The edge of the payment card may also include dimples, chips, and/or other complex design patterns cut into the face of the payment card close to the edge. The payment card may also include inclusions of other materials, such as metals, ceramic, and/or polymer to be added which fill or partially fill any voids produced by the edge patterns.

20 Claims, 9 Drawing Sheets

(56) References Cited

U.S. PATENT DOCUMENTS

| | | |
|---|---|---|
| D792,411 S | 7/2017 | Beals et al. |
| 10,083,383 B1 | 9/2018 | Herrington et al. |
| D840,404 S | 2/2019 | Beals et al. |
| 10,360,489 B1 | 7/2019 | Herrington et al. |
| D864,968 S | 10/2019 | Beals |
| D867,450 S | 11/2019 | Maiman et al. |
| 10,636,020 B1 | 4/2020 | Crawford et al. |
| D896,887 S | 9/2020 | Herrington et al. |
| D896,888 S | 9/2020 | Herrington et al. |
| 10,765,580 B1* | 9/2020 | Augustine ............... B32B 3/266 |
| 10,789,808 B1* | 9/2020 | Lindelsee ........... G07F 17/3251 |
| 2001/0003445 A1* | 6/2001 | Gauther ............... G06K 19/077 345/87 |
| 2001/0012364 A1* | 8/2001 | Einfeldt ............... G06K 19/073 380/46 |
| 2002/0013914 A1* | 1/2002 | Posch ................... G06K 19/07 713/600 |
| 2003/0035917 A1 | 2/2003 | Hyman |
| 2003/0047616 A1* | 3/2003 | Mase ..................... G06K 1/126 235/494 |
| 2004/0031855 A1* | 2/2004 | Takahashi ............... B32B 33/00 235/492 |
| 2005/0021525 A1* | 1/2005 | Thueringer ........ G06K 19/0723 |
| 2006/0035546 A1* | 2/2006 | Mack ....................... B32B 5/08 442/49 |
| 2007/0068621 A1* | 3/2007 | Ou ........................ B32B 37/185 156/252 |
| 2008/0034691 A1* | 2/2008 | Nelson .................... B32B 15/20 52/395 |
| 2008/0059369 A1 | 3/2008 | Nelms et al. |
| 2009/0041986 A1* | 2/2009 | Zhang ................. B81C 1/00103 264/300 |
| 2009/0159691 A1 | 6/2009 | Halbur et al. |
| 2010/0276920 A1 | 11/2010 | Woodman et al. |
| 2013/0300101 A1 | 11/2013 | Wicker et al. |
| 2019/0108431 A1 | 4/2019 | Lee |
| 2021/0256339 A1 | 8/2021 | Moncada |
| 2021/0279717 A1 | 9/2021 | Gupta |
| 2021/0304189 A1 | 9/2021 | Gupta |
| 2021/0365927 A1 | 11/2021 | Gupta |
| 2022/0253664 A1 | 8/2022 | Vassal et al. |

* cited by examiner

PAYMENT CARD WITH ENHANCED EDGE PATTERNS

CROSS-REFERENCE TO RELATED APPLICATIONS

This application is a continuation of U.S. patent application Ser. No. 17/358,712, filed Jun. 25, 2021, all of which is herein incorporated by reference in its entirety.

FIELD OF USE

Aspects of the disclosure relate generally to payment cards. More specifically, aspects of the disclosure may provide for a payment card having an enhanced edge morphology.

BACKGROUND

Payment card users often have multiple payment cards, so payment card issuers would prefer that their payment card be used more often than payment cards from other payment cards issuers. A physical credit card can achieve this through appeal, ease of use, and being enjoyable to touch, hold, and handle.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In accordance with certain embodiments, a payment card may comprise a front surface; a back surface opposite the front surface; four edge walls extending between the front surface and the back surface; and four rounded corners each located between two of the edge walls. The four edge walls may comprise a top edge wall, a bottom edge wall, and two side edge walls. Additionally, at least one of the edge walls may comprise an enhanced edge pattern made of a first material and extending along at least a portion of the edge wall. The enhanced edge pattern may comprise a plurality of depressions. One or more of the plurality of depressions may be at least partially filled with a second material, wherein the second material is different than the first material.

In accordance with other aspects, the second material may be one of a metal, a ceramic, or a polymer. Additionally, the enhanced edge pattern may comprise a reeded edge extending along at least a portion of one or more of the edge walls. Further, the enhanced edge pattern may comprise a crenelated edge extending along at least a portion of one or more of the edge walls. The plurality of depressions may be regularly spaced along one or more of the edge walls. Additionally, the plurality of depressions may be irregularly spaced along one or more of the edge walls. The enhanced edge pattern may comprise one or more embossments and one or more de-embossments. The front surface and the back surface may be approximately 3⅜ inches long and 2⅛ inches wide and 1/32 inch thick. Additionally, the payment card may comprise a magnetic strip located on the back surface of the payment card. Further, the payment card may comprise an EMV chip.

In accordance with further aspects, a payment card may comprise a rectangular front surface; a rectangular back surface opposite the rectangular front surface; and four edge walls extending between the rectangular front surface and the rectangular back surface. The four edge walls may comprise a pair of length-side edge walls and a pair of width-side edge walls. The pair of length-side edge walls may be perpendicular to and extending along a length perimeter of the rectangular front surface and the rectangular back surface. The pair of width-side edge walls may be perpendicular to and extending along a width perimeter of the rectangular front surface and the rectangular back surface. Each of the pair of width-side edge walls may connect to each of the pair of length-side edge walls. The payment card may also comprise a first material located on a top side of the edge walls and a bottom side of the edge walls with a second material sandwiched between the first material on the top side and the bottom side. The second material may be different from the first material. Further, at least one of the edge walls may include an enhanced edge pattern extending along at least a portion of the at least one of the edge walls to improve a gripability of the payment card.

In accordance with yet other aspects, a payment card may comprise a front surface; a back surface opposite the front surface; a magnetic strip located on the back surface; an EMV chip; four edge walls extending between the front surface and the back surface; and four rounded corners each located between two of the edge walls. The four edge walls may comprise a top edge wall, a bottom edge wall, and two side edge walls. The payment card may also comprise a first material located on a top side of the edge walls and a bottom side of the edge walls. The payment card may also comprise a second material and a third material alternating and sandwiched between the first material on the top side and the bottom side. The first material, the second material, and the third material may all be different materials. Additionally, at least one of the edge walls may comprise an enhanced edge pattern to improve a gripability of the payment card. The enhanced edge pattern may comprise one or more of the following: a plurality of depressions, a reeded edge extending along at least a portion of one or more of the edge walls, a crenelated edge extending along at least a portion of one or more of the edge walls, or embossments and de-embossments along at least a portion of one or more of the edge walls.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Embodiments discussed herein depict a payment card having enhanced edge patterns. Exemplary payment cards can include credit cards, debit cards, ATM cards, reward cards, gift cards, and money access cards ("MAC"). The payment card may include a complex edge morphology on the physical card that makes the payment card more likely to be used by consumers and makes the payment card stand out due to the enhanced edge design. The edge of the payment card may be reeded, similar to a US quarter. The edge of the payment card may be crenelated, similar to a top of a castle. Additionally, the edge of the payment card may include embossments and de-embossments and/or various shapes of various sizes on one or more of the edge walls extending around the payment card. The edge of the payment card may also have a channel cut into the edge. The edge of the payment card may also include dimples, chips, and/or other complex design patterns cut into the face of the payment card close to the edge. The payment card may also include inclusions of other materials, such as metals, ceramic, and/or polymer to be added which fill or partially fill any voids produced by the edge patterns. These additional materials might make the payment card slide with less friction, make the payment card easier to pull out of a wallet or purse, and/or make the card more pleasing to hold or handle.

Figure 1:
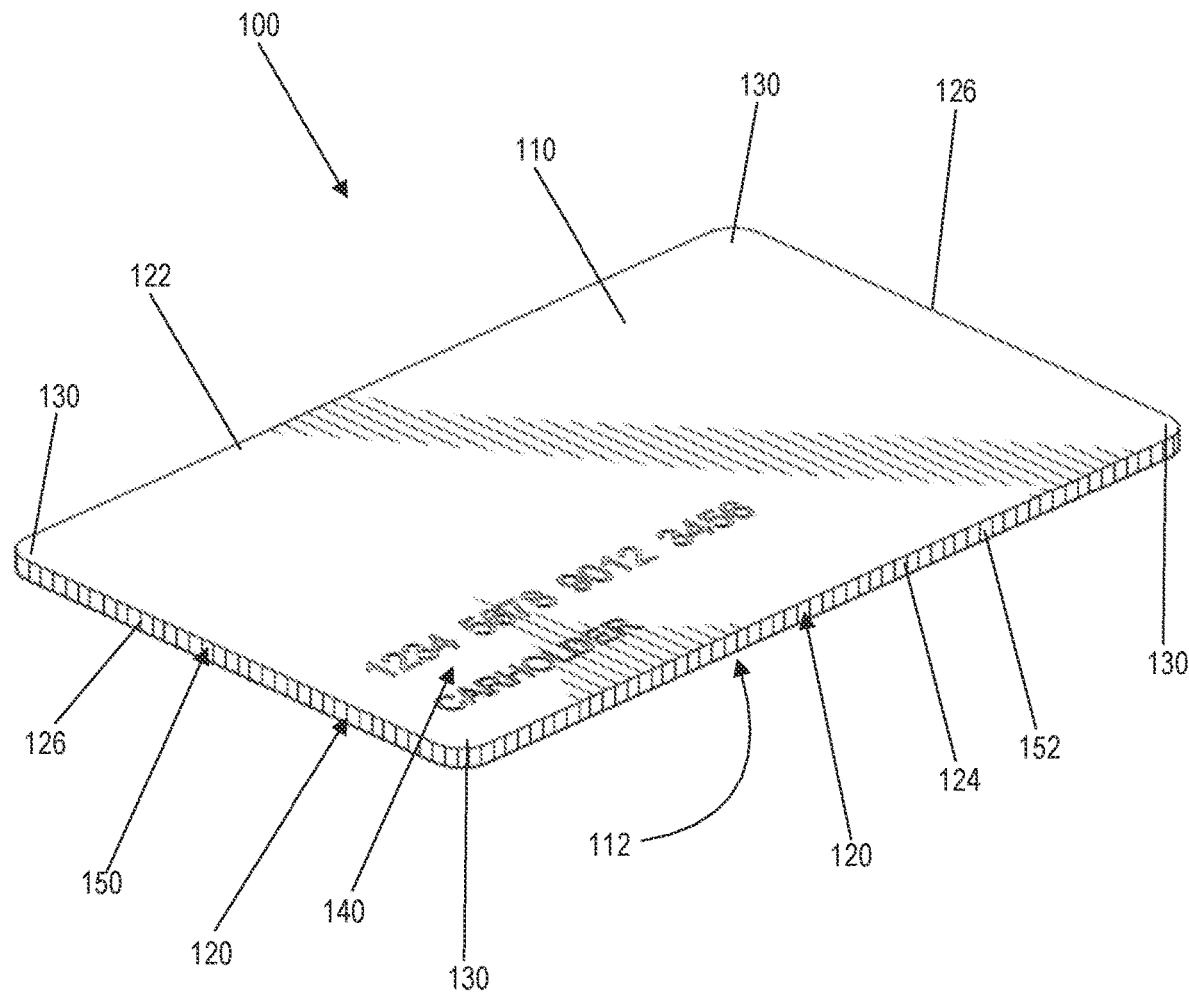
FIG. 1 depicts a perspective view of an example of a payment card with an enhanced edge patterns that may be used in implementing one or more aspects of the disclosure in accordance with one or more illustrative aspects discussed herein.

An embodiment of a payment card 100 is illustrated in FIG. 1. The payment card 100 may include a front surface 110 and an opposed back surface 112. The front surface 110 and the back surface 112 may be rectangular shaped. The payment card 100 may also include four edge walls 120 extending between the front surface 110 and the back surface 112.

The four edge walls 120 may include a pair of length-side edge walls 122, 124 or a top edge wall 122 and a bottom edge wall 124. The four edge walls 120 may also include a pair of width-side edge walls 126 or side walls 126 that are located between the top edge wall 122 and the bottom edge wall 124. The pair of length-side edge walls 122, 124 may be perpendicular to and extending along a length perimeter of the front surface 110 and the back surface 110. The pair of width-side edge walls 126 may be perpendicular to and extending along a width perimeter of the front surface 110 and the back surface 112. Each of the pair of width-side edge walls 126 may connect to each of the pair of length-side edge walls 122, 124. The payment card 100 may also include four rounded corners 130. The four rounded corners 130 may be located at the corners of the front surface 110 and the back surface 112 and between two of the edge walls 120.

As illustrated in FIG. 1, the edge walls 120 include an enhanced edge pattern 150, such as a reeded edge 152. Other enhanced edge patterns may be utilized with the payment card 100 as will be explained and detailed below.

The front surface 110 may include payment card information 140 that may include, but not be limited to, an institution name and/or logo, an embossing and/or printing of the payment card user's account number and name, as well as the payment card's expiration date. In other embodiments of the invention, the back surface 112 may include any or all of the payment card information 140 that may include, but not be limited to, the institution name and/or logo, the embossing and/or printing of the payment card user's account number and name, as well as the payment cards expiration date. The back surface 112 may include one or more of the following: a magnetic strip, a signature block, a security code (such as for example, card verification value -CVV code), and other potential features. In other embodiments of the invention, the front surface 110 may also include one or more of the following: the magnetic strip, the signature block, the security code, and other potential features. The payment card 100 may also include an EMV chip. Additionally, the payment card 100 with the front surface 110 and the back surface 112 may be a size similar to traditional payment cards, credit cards, gift cards, etc. For example, the payment card 100, the front surface 110, and the back surface 112 may be approximately 3⅜ inches long, 2⅛ inches wide, and 1/32 inch thick. The payment card 100, the front surface 110, and the back surface 112 may be other sizes without departing from this invention.

FIGS. 2-6B illustrate a payment card with various enhanced edge patterns that may be utilized with the payment card. The payment card may include enhanced edge patterns extending along one or more of the edge walls. The payment card may include a complex edge morphology on the physical card that may make the payment card more likely to be used by consumers and makes the payment card stand out due to the enhanced edge design. Specifically, as illustrated in FIG. 1, the edge walls 120 of the payment card 100 and the enhanced edge pattern 150 may be reeded 152, similar to a US quarter. In another embodiment, the edge walls 120 of the payment card 100 and the enhanced edge pattern 150 may be crenelated, similar to a top of a castle. In a further embodiment, the edge walls 120 of the payment card 100 and the enhanced edge pattern 150 may include embossments and de-embossments extending along the edge walls 120. In yet another embodiment, the edge walls 120 of the payment card 100 and the enhanced edge pattern 150 may also have a channel cut into the edge wall 120.

Figure 2:
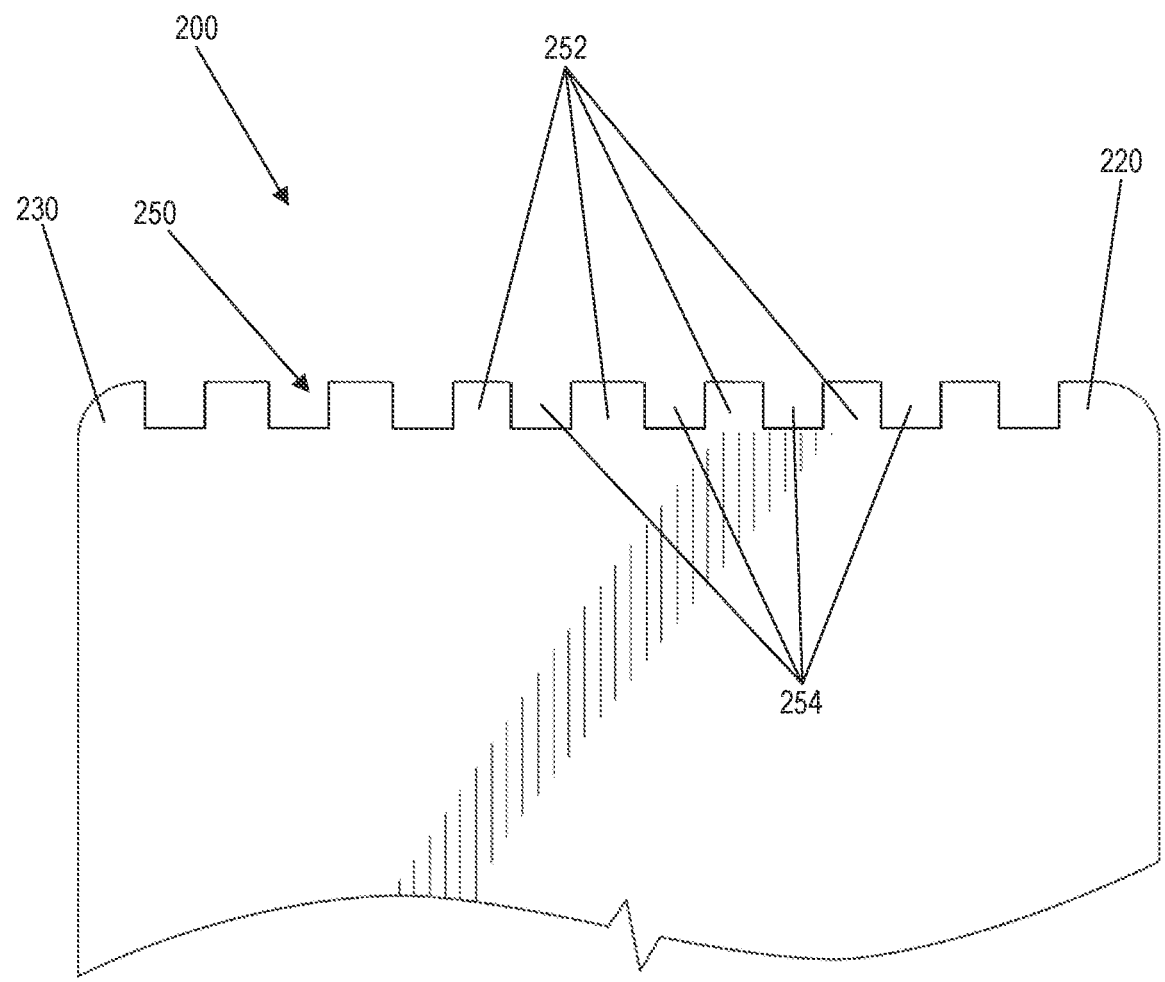
FIG. 2 depicts a partial plan view of an alternative embodiment of the payment card of FIG. 1 with enhanced edge patterns in accordance with one or more illustrative aspects discussed herein.

FIG. 2 depicts a plan view of an alternative embodiment of a payment card 200 with enhanced edge patterns 250. For the embodiment of FIG. 2, the features of the payment card 200 are referred to using similar reference numbers under the "2XX" series of reference numerals, rather than "1XX" as used in the embodiment of FIG. 1. Accordingly, certain features of the payment card 200 that were already described above with respect to the payment card 100 of FIG. 1 may be described in lesser detail, or may not be described at all. As illustrated specifically in FIG. 2, the payment card 200 may include an enhanced edge pattern 250 that may include a plurality of projections 252 and/or a plurality of depressions 254. In some embodiments, the payment card 200 may include only the plurality of depressions 254. In other embodiments, the enhanced edge pattern 250 may include a reeded edge, a crenelated edge, a channel, and/or embossments and de-embossments that extend along the edge walls 220.

As illustrated in FIG. 2, the enhanced edge pattern 250 extends along one of the side edge walls 226 and/or or any of the edge walls 220. In other embodiments, the enhanced edge pattern 250 may extend along any one of the edge walls 220, any number of the edge walls 220, or all of the edge walls 220. The enhanced edge pattern 250 may be located on one or more of the edge walls 220. The enhanced edge pattern 250 may be located on and extend along a full length of the edge wall 220. Additionally, the enhanced edge pattern 250 may be located on and extend along a portion of one or more of the edge walls 220. For example, the enhanced edge pattern 250 may be located near one of the corners 230 and extend along a half portion of one or more of the edge walls 220.

The plurality of projections 252 and the plurality of depressions 254 may include various sizes, shapes, patterns, symmetry, asymmetry, etc. As illustrated in the figures and specifically FIG. 2, the projections 252 do not extend past a plane of the edge walls 220 of the payment card 200. In other embodiments, the projections 252 may extend past the plane of the edge walls 220 of the payment card 200. As illustrated in FIG. 2, the plurality of projections 252 and the plurality of depressions 254 are rectangular-shaped. Other shapes and sizes may be utilized for the one or more of the plurality of projections 252 and the one or more of the plurality of depressions 254 for the enhanced edge pattern 250.

FIGS. 3A-6B illustrate various other exemplary embodiments of the enhanced edge pattern for the payment card. For the embodiments of FIGS. 3A-6B, the features of the payment card 300, 400, 500, 600 are referred to using similar reference numbers under the "3XX", "4XX", "5XX", and "6XX" series of reference numerals respectively, rather than "1XX" as used in the embodiment of FIG. 1. Accordingly, certain features of the payment card 300, 400, 500, 600 that were already described above with respect to the payment card 100 of FIG. 1 may be described in lesser detail, or may not be described at all.

Figure 3A:
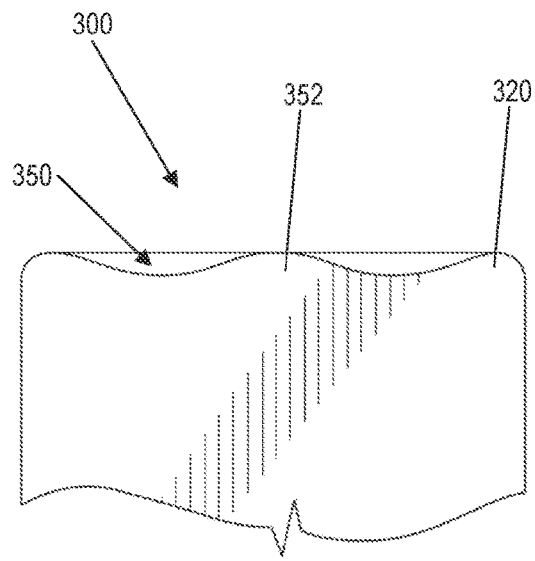
FIGS. 3A and 3B depict a partial plan view of another alternative embodiment of the payment card of FIG. 1 with discrete or continuous enhanced edge patterns in accordance with one or more illustrative aspects discussed herein.
Figure 3B:
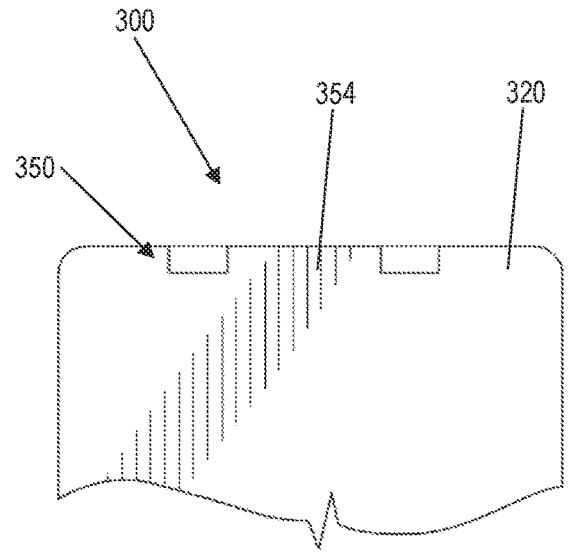

Specifically, FIGS. 3A and 3B depict a plan view of another alternative embodiment of a payment card 300 with discrete or continuous enhanced edge patterns 350. As illustrated in FIG. 3A, the enhanced edge pattern 350 may be a continuous edge pattern 352 that includes depressions and projections with curved edges and extending continuously along an edge wall 320. Conversely, as illustrated in FIG. 3B, the enhanced edge pattern 350 may be a discrete edge pattern 354 that includes depressions and projections that extend along the edge wall 320. Other shaped and sized projections and/or depressions may be utilized in other embodiments for the enhanced edge pattern 350.

Figure 4A:
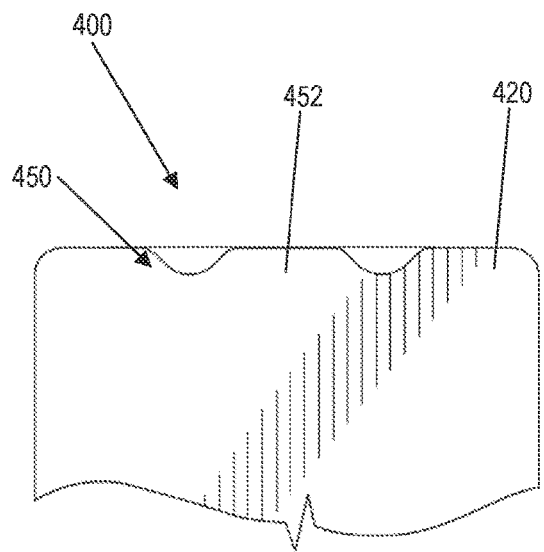
FIGS. 4A and 4B depict a partial plan view of another alternative embodiment of the payment card of FIG. 1 with smooth or regular enhanced edge patterns in accordance with one or more illustrative aspects discussed herein.
Figure 4B:
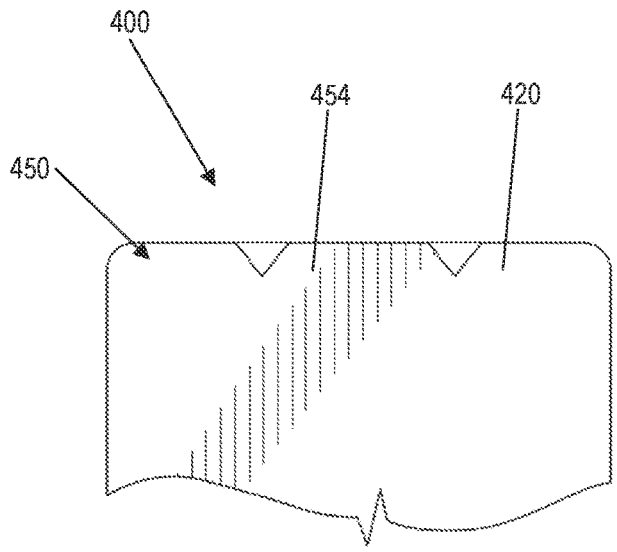

FIGS. 4A and 4B depict a plan view of another alternative embodiment of a payment card 400 with smooth or regular enhanced edge patterns 450. As illustrated in FIG. 4A, the enhanced edge pattern 450 may be a smooth edge pattern 452 with smooth edges extending along an edge wall 420. For example, as illustrated in FIG. 4A, the smooth edge pattern 452 may include curved and smooth depressions. Conversely, as illustrated in FIG. 4B, the enhanced edge pattern 450 may be a regular shaped edge pattern 454 that extends along the edge wall 420. For example, as illustrated in FIG. 4B, the regular shaped edge pattern 454 may include triangular depressions. Other shaped and sized projections and/or depressions may be utilized in other embodiments for the enhanced edge pattern 450.

Figure 5A:
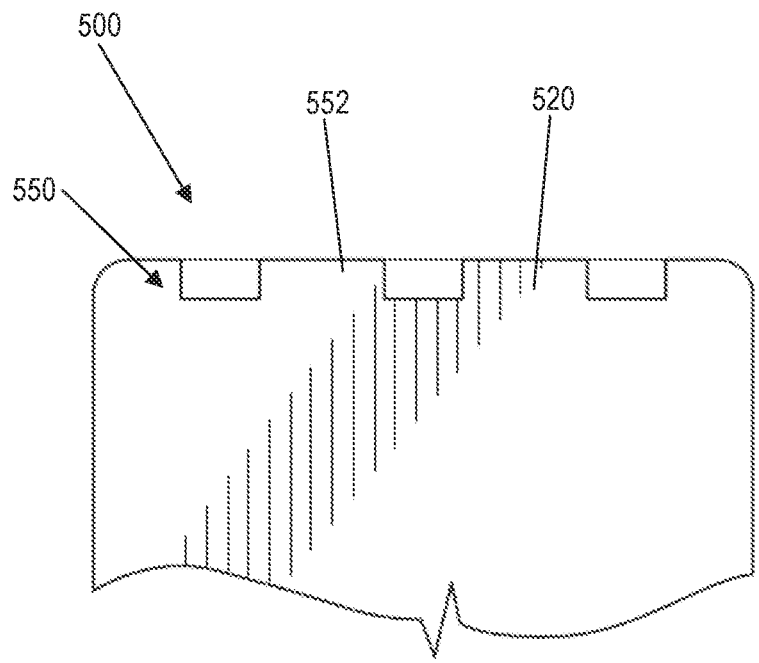
FIGS. 5A and 5B depict a partial plan view of another alternative embodiment of the payment card of FIG. 1 with regularly spaced or irregularly spaced enhanced edge patterns in accordance with one or more illustrative aspects discussed herein.
Figure 5B:
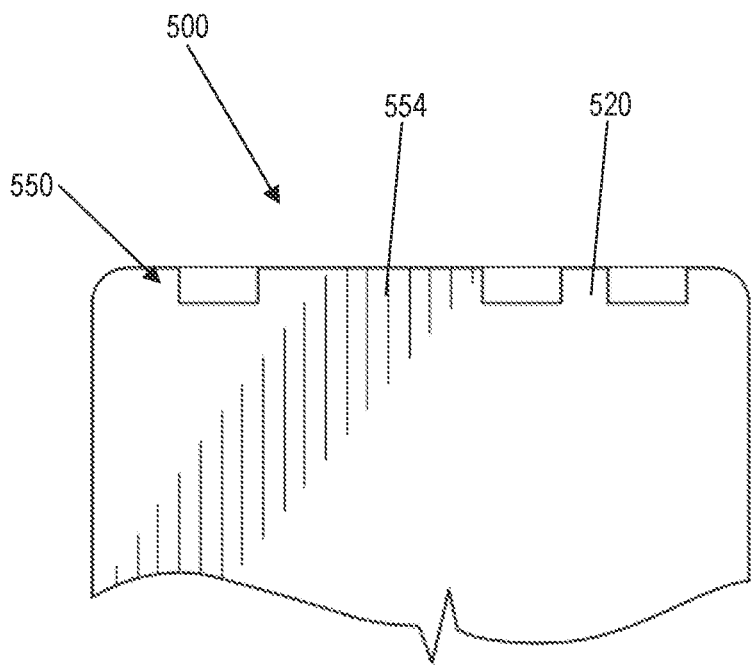

FIGS. 5A and 5B depict a plan view of another alternative embodiment of a payment card 500 with regularly spaced or irregularly spaced enhanced edge patterns 550. As illustrated in FIG. 5A, the enhanced edge pattern 550 may be a regularly shaped edge pattern 552 with projections and depressions regularly and evenly spaced extending along an edge wall 520. For example, as illustrated in FIG. 5A, the regularly shaped edge pattern 552 may include rectangular projections and/or depressions that are evenly spaced along the edge wall 520. Conversely, as illustrated in FIG. 5B, the enhanced edge pattern 550 may be an irregularly spaced edge pattern 554 that extends along the edge wall 520. For example, as illustrated in FIG. 5B, the irregularly spaced edge pattern 554 may include rectangular projections and/or depressions that are not evenly spaced along the edge wall 520. Other shaped and sized projections and/or depressions may be utilized in other embodiments for the enhanced edge pattern 550.

Figure 6A:
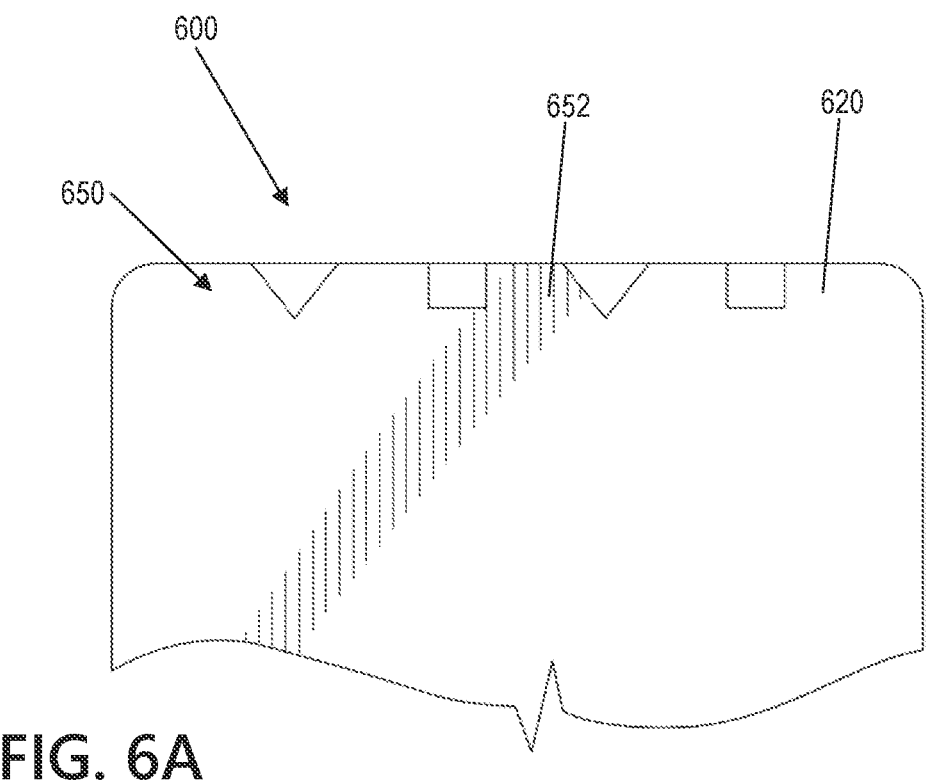
FIGS. 6A and 6B depict a partial plan view of another alternative embodiment of the payment card of FIG. 1 with various shapes for enhanced edge patterns in accordance with one or more illustrative aspects discussed herein.
Figure 6B:
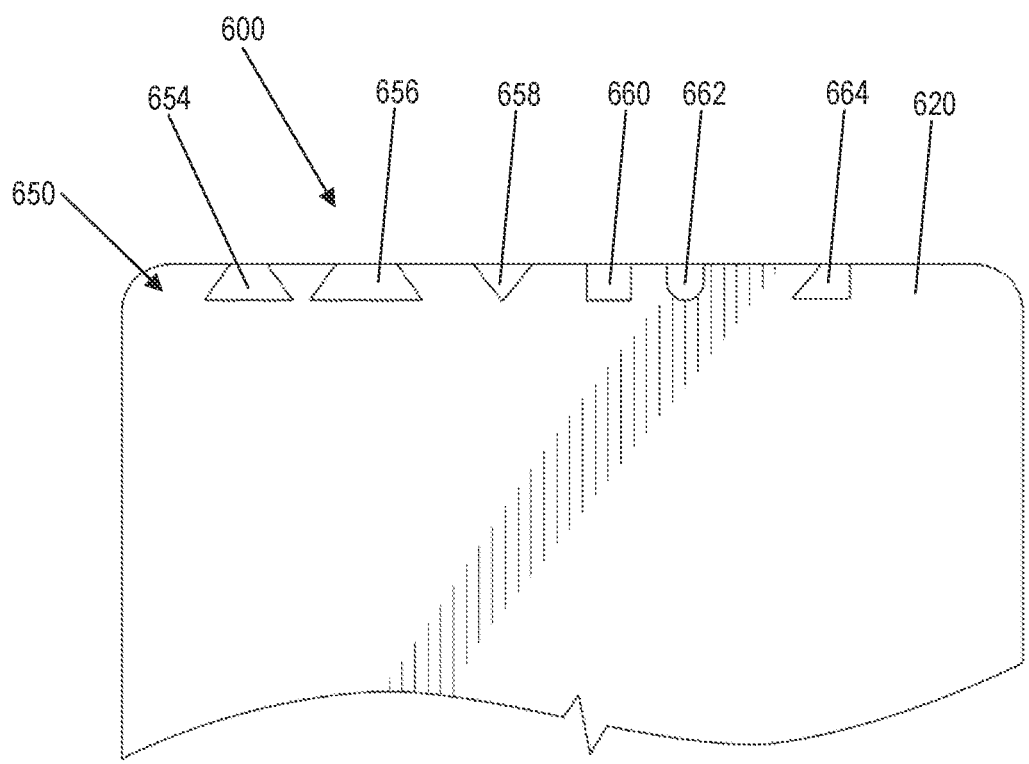

FIGS. 6A and 6B depict a plan view of another alternative embodiment of a payment card 600 with various shapes for enhanced edge patterns 650. As illustrated in FIG. 6A, the enhanced edge pattern 650 may include an alternating shape edge pattern 652 extending along an edge wall 620. For example, as illustrated in FIG. 6A, the alternating shape edge pattern 652 may include a triangular shaped depression followed by a rectangular shaped depression and so on that are spaced along the edge wall 620. Additionally, the alternating shape edge pattern 650 may include different shape patterns that extend along the edge wall 620. Additionally, as illustrated in FIG. 6B, the enhanced edge pattern 650 may include various other shapes, both symmetrical shapes and asymmetrical shapes. The enhanced edge pattern 650 may include any combination of these various shapes extending along the edge wall 620. For example, as illustrated in FIG. 6B, the enhanced edge pattern 650 illustrates various shapes for depressions and/or projections, such as a smaller symmetric trapezoid 654, a larger symmetric trapezoid 656, a triangle 658, a square or rectangle 660, a curved cylinder 662, and an asymmetric trapezoid 664. Other shaped and sized projections and/or depressions may be utilized in other embodiments for the enhanced edge pattern 650.

Figure 7A:
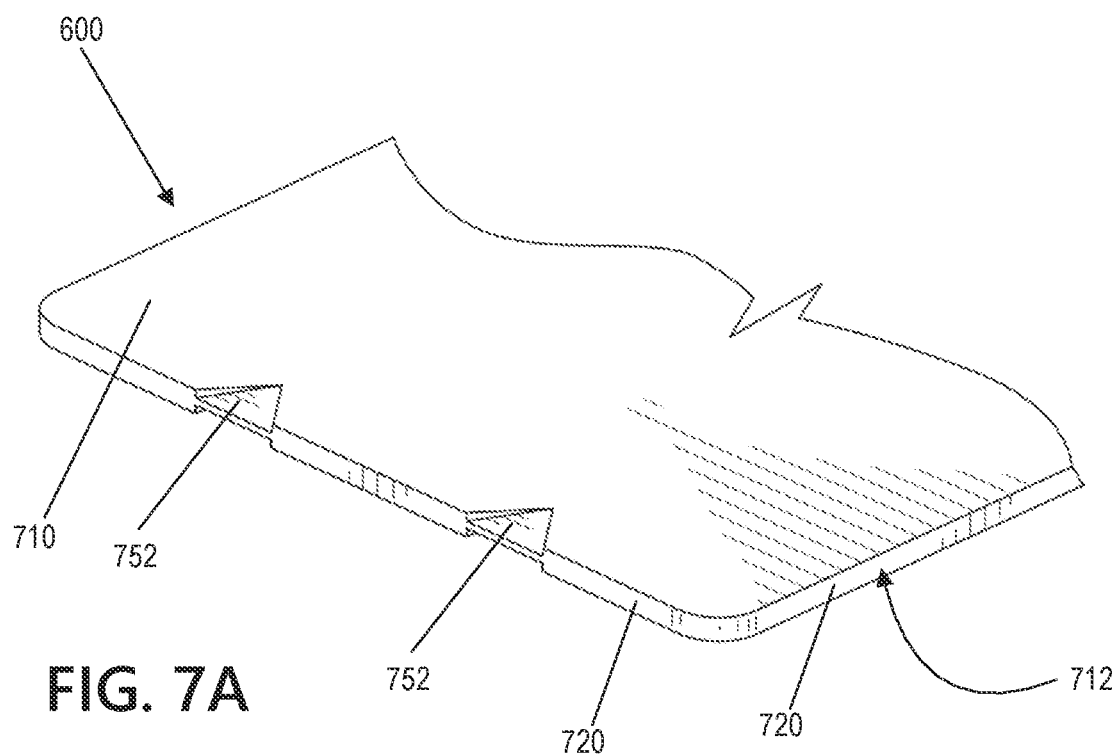
FIGS. 7A and 7B depicts another alternative embodiment of the payment card of FIG. 1 in accordance with one or more illustrative aspects discussed herein.
Figure 7B:
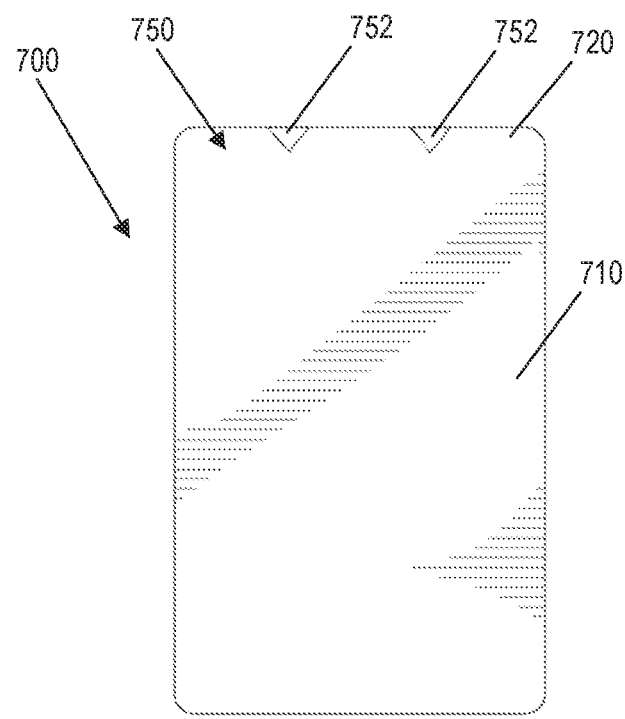

FIGS. 7A and 7B depicts another alternative embodiment of a payment card 700. For the embodiment of FIGS. 7A and 7B, the features of the payment card 700 are referred to using similar reference numbers under the "7XX" series of reference numerals, rather than "1XX" as used in the embodiment of FIG. 1. Accordingly, certain features of the payment card 700 that were already described above with respect to the payment card 100 of FIG. 1 may be described in lesser detail, or may not be described at all. As illustrated in FIGS. 7A and 7B, the payment card 700 may include an enhanced edge pattern 750 with various depressions, projections, and or features 752 taken from the edge walls 720 of the payment card that do not penetrate the entire width of the payment card 700. The enhanced edge pattern 750 may include dimples, chips, and/or other complex design patterns located on the edge walls 720 of the payment card 700 that are cut into the front surface 710 and/or the back surface 712 of the payment card 700 close to the edge walls 720. For example, as illustrated in FIGS. 7A and 7B, the enhanced edge pattern 750 includes rectangular triangle shaped depressions and/or projections 752 cut into both the front surface 710 and the back surface 712 of the payment card close to the edge wall 720. Other shaped and sized projections and/or depressions may be utilized in other embodiments for the enhanced edge pattern 750.

Figure 8A:
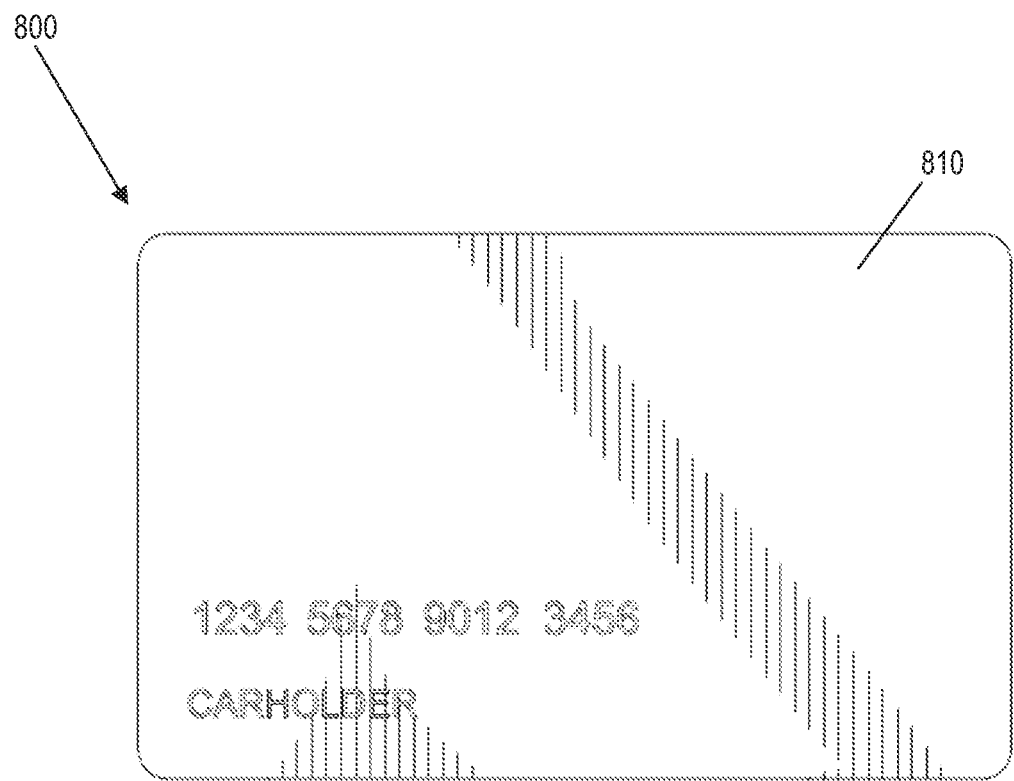
FIGS. 8A and 8B depicts a multi-material payment card in accordance with one or more illustrative aspects discussed herein.
Figure 8B:
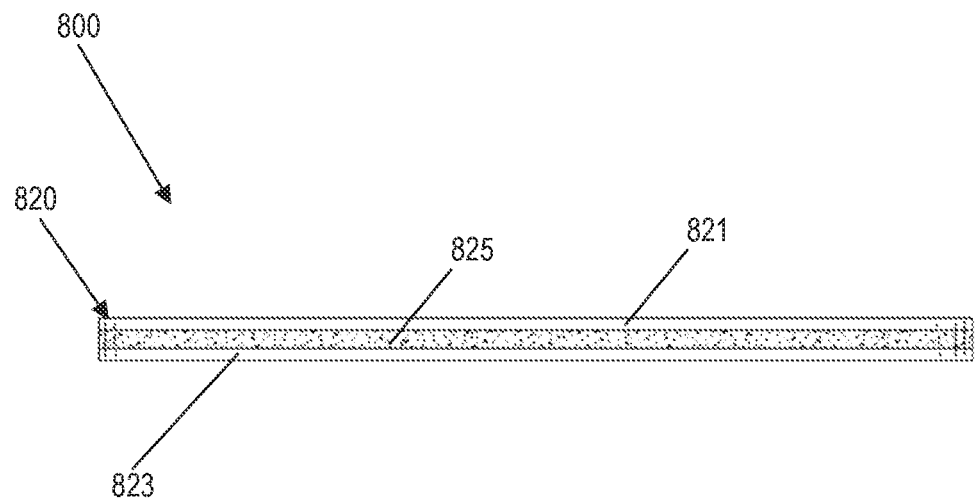

FIGS. 8A and 8B depicts a multi-material edge payment card 800. Specifically, FIG. 8A illustrates a plan view of the payment card 800 with a top surface 810 and FIG. 8B illustrates a cross-section view of an edge wall 820 of the payment card 800. For the embodiment of FIGS. 8A and 8B, the features of the payment card 800 are referred to using similar reference numbers under the "8XX" series of reference numerals, rather than "1XX" as used in the embodiment of FIG. 1. Accordingly, certain features of the payment card 800 that were already described above with respect to the payment card 100 of FIG. 1 may be described in lesser detail, or may not be described at all. In one embodiment, one or more of the edge walls 820 of the payment card 800 may include a top edge portion 821 and a bottom edge portion 823. The top edge portion 821 may be located on a top side of one or more of the edge walls 820. The bottom edge portion 823 may be located on a bottom side of one or more of the edge walls 820. The top edge portion 821 and the bottom edge portion 823 may be made of a first material. Additionally, one or more of the edge walls 820 of the payment card 800 may include a middle portion 825 that may be sandwiched between the top edge portion 821 and the bottom edge portion 823. The middle portion 825 may be made of a second material. The second material may be different than the first material. The first material and the second material may be one of a metal, ceramic, and/or polymer, or any combination thereof. Additionally, the payment card 800 may include one or more of the enhanced edge patterns as described above for FIGS. 2-7B.

Figure 9A:
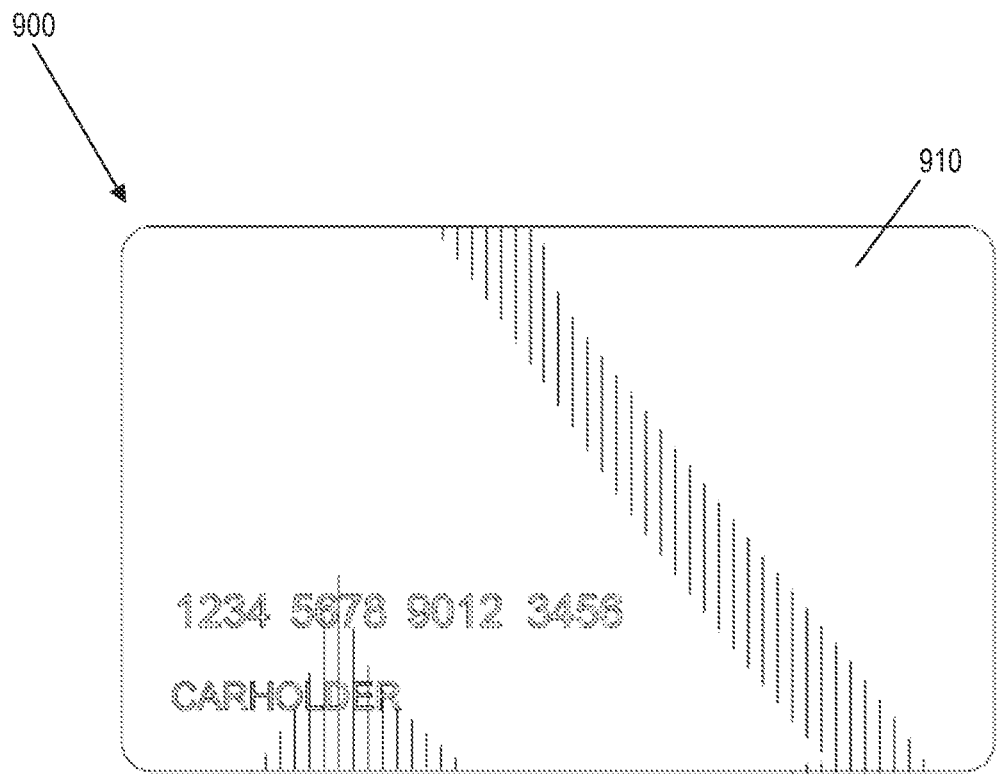
FIGS. 9A and 9B depicts another alternative embodiment of a multi-material payment card in accordance with one or more illustrative aspects discussed herein.
Figure 9B:
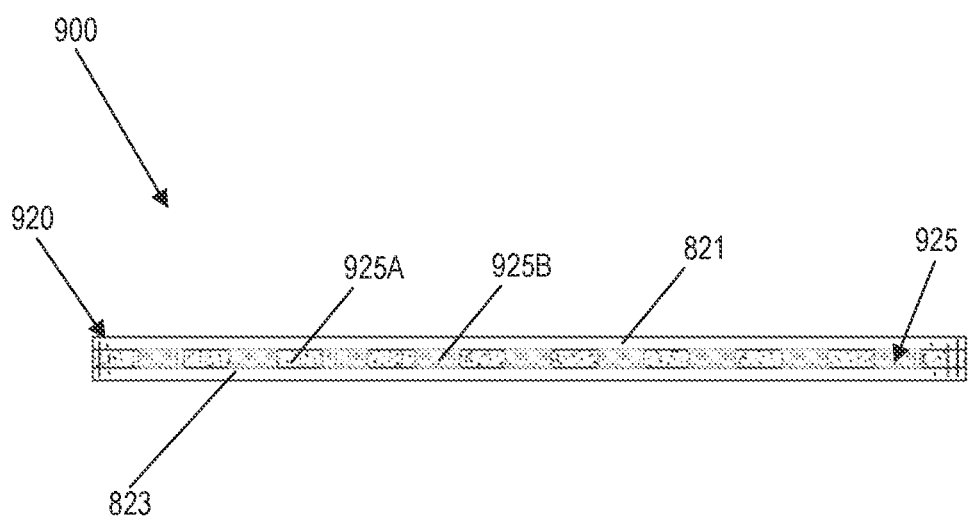

FIGS. 9A and 9B depicts another alternative embodiment of a multi-material edge payment card 900. Specifically, FIG. 9A illustrates a plan view of the payment card 900 with a top surface 910 and FIG. 9B illustrates a cross-section view of an edge wall 920 of the payment card 900. For the embodiment of FIGS. 9A and 9B, the features of the payment card 900 are referred to using similar reference numbers under the "9XX" series of reference numerals, rather than "1XX" as used in the embodiment of FIG. 1. Accordingly, certain features of the payment card 900 that were already described above with respect to the payment card 100 of FIG. 1 may be described in lesser detail, or may not be described at all. In one embodiment, one or more of the edge walls 920 of the payment card 900 may include a top edge portion 921 and a bottom edge portion 923. The top edge portion 921 may be located on a top side of one or more of the edge walls 920. The bottom edge portion 923 may be located on a bottom side of one or more of the edge walls 920. The top edge portion 921 and the bottom edge portion 923 may be made of a first material. Additionally, one or more of the edge walls 920 of the payment card 900 may include a middle portion 825 that may be sandwiched between the top portion 921 and the bottom portion 923. The middle portion 925 may be made of a second material 925A and a third material 925B. The second material 925A and third material 925B may alternate along the middle portion 925 as illustrated in FIG. 9B. The second material 925A and the third material 925B may be different materials. Additionally, the second material 925A and the third material 925B may be different materials than the first material. The first material, second material 925A, and the third material 925B may be one of a metal, ceramic, and/or polymer, or any combination thereof. Additionally, the payment card 900 may include one or more of the enhanced edge patterns as described above for FIGS. 2-7B.

Figure 10:
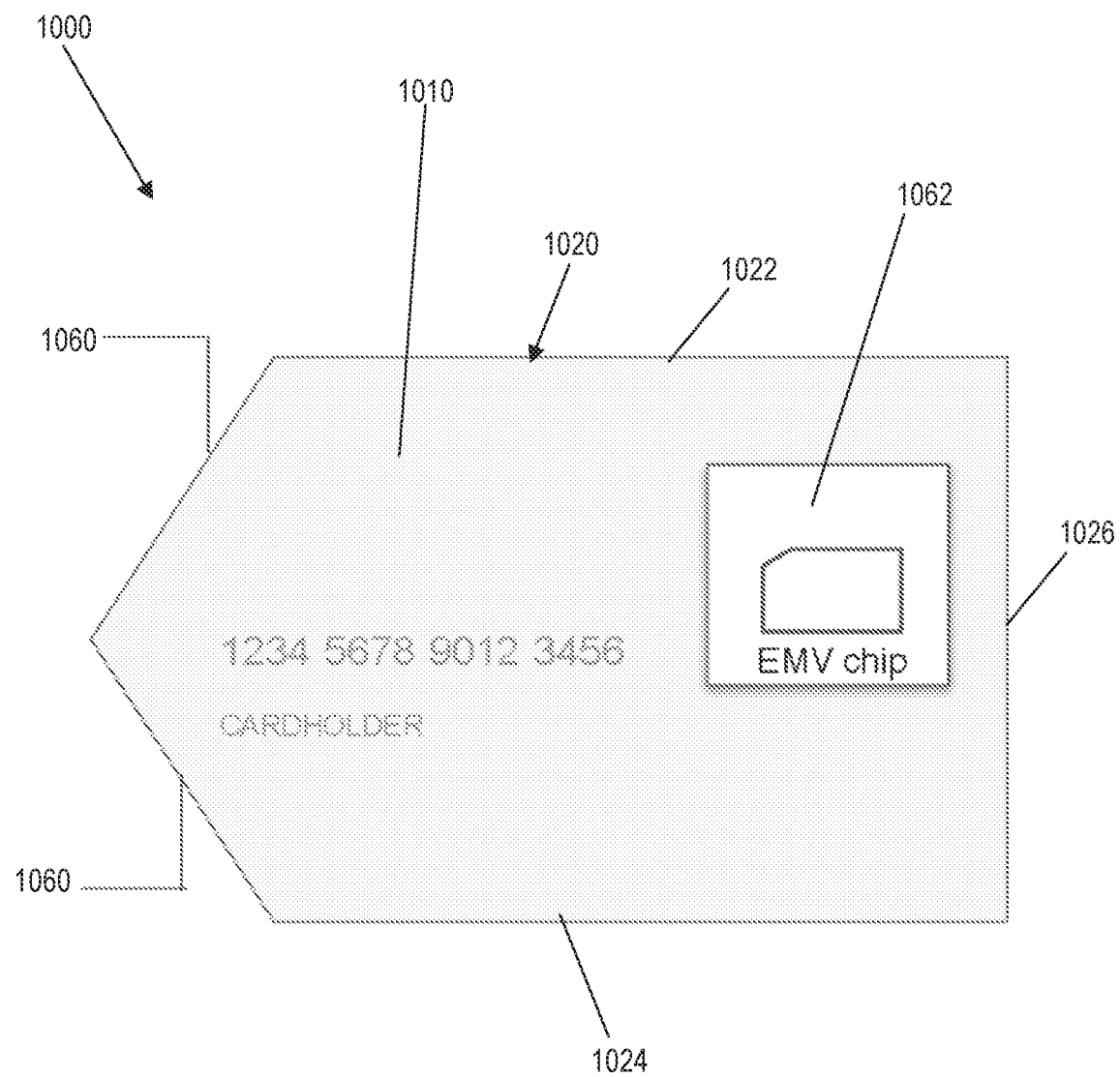
FIG. 10 depicts a plan view of yet another alternative embodiment of a payment card in accordance with one or more illustrative aspects discussed herein.

FIG. 10 depicts a plan view of yet another alternative embodiment of a payment card 1000. For the embodiment of FIG. 10, the features of the payment card 1000 are referred to using similar reference numbers under the "10XX" series of reference numerals, rather than "1XX" as used in the embodiment of FIG. 1. Accordingly, certain features of the payment card 1000 that were already described above with respect to the payment card 100 of FIG. 1 may be described in lesser detail, or may not be described at all. The payment card 1000 as illustrated in FIG. 10 may be a payment card shaped like an EMV chip. As illustrated in FIG. 10, the payment card 1000 may include a front surface 1010 and an opposed back surface (not shown). The payment card 1000 may also include edge walls 1020 extending between the front surface 1010 and the back surface. The edge walls 1020 may include a top edge wall 1022, a bottom edge wall 1024, and a side wall 1026 located between the top edge wall 1022 and the bottom edge wall 1024. The payment card 1000 may also include one or more notches 1060 located in a corner portion of the payment card 1000. The one or more notches 1060 may be located on both sides of the payment card 1000.

For example, when a user is reaching into their wallet for the payment card 1000, the notches 1060 may allow the user to quickly determine whether or not the payment card 1000 has an EMV chip 1062 without having to pull the entire payment card 1000 out of the wallet. The notches 1060 may be helpful especially in scenarios where a payment terminal can handle either a payment card with an EMV chip or a payment card with a magnetic strip, but not both. The notches 1060 may be located on both sides of the payment card 1000 so that the user does not have to remember whether to check a right side or a left side of the payment card 1000. If the payment card 1000 is placed upside down in the wallet, the user can still verify by looking at the EMV chip 1062 which should be visible in the slot when the payment card 1000 is in that specific position and orientation in the wallet. Additionally, the payment card 1000 may include one or more of the enhanced edge patterns as described above for FIGS. 2-9.

While FIGS. 2-10 illustrate payment cards with specific enhanced edge patterns, the payment card may include any combination of the various enhanced edge patterns as illustrated in FIGS. 2-10 and described above with reference to FIGS. 2-10. Additionally, the enhanced edge patterns from FIGS. 2-10 may extend along one of the side edge walls. In other embodiments, the enhanced edge patterns from FIGS. 2-10 may extend along any one of the edge walls, any number of the edge walls, or all of the edge walls. The enhanced edge patterns from FIGS. 2-10 may be located on one or more of the edge walls. The enhanced edge patterns from FIGS. 2-10 may be located on and extend along a full length of the edge wall. Additionally, the enhanced edge patterns from FIGS. 2-10 may be located on and extend along a portion of one or more of the edge walls. For example, the enhanced edge patterns from FIGS. 2-10 may be located near one of the corners and extend along a half portion of one or more of the edge walls.

Additionally, the payment cards as described above with reference to FIGS. 2-10 may also include inclusions of other materials, such as metals, ceramic, and/or polymer to be added which fill or partially fill any voids or depressions produced by the various edge patterns extending along the edge walls. For example, the edge walls may include an enhanced edge pattern made of a first material. The enhanced edge pattern may include a plurality of projections and depressions. One or more of the depressions from the enhanced edge patterns from FIGS. 2-10 may be filled or at least partially filled with a second filling material. The second filling material may be different than the first material. The second filling material may be metal, ceramic, and/or polymer, or any combination thereof. Other materials may be utilized for the second filling material. These additional materials might help to make the payment card slide with less friction, make the payment card easier to pull out of a wallet or purse, and/or make the card more pleasing to hold or handle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A payment card comprising:
   a front surface;
   a back surface opposite the front surface; and
   four edge walls extending between the front surface and the back surface, the four edge walls comprising a top edge wall, a bottom edge wall, and two side edge walls;
   wherein at least one of the edge walls comprises an enhanced edge pattern that extends along at least a portion of the edge wall to improve a gripability of the payment card, the enhanced edge pattern comprising one or more of: a plurality of depressions, a reeded edge extending along at least a portion of one or more of the edge walls, a crenelated edge extending along at least a portion of one or more of the edge walls, or one or more embossments and one or more de-embossments.

2. The payment card of claim 1, wherein the enhanced edge pattern comprises a first material and a second material different than the first material.

3. The payment card of claim 1, wherein the front surface and the back surface are approximately 3⅜ inches long and 2⅛ inches wide and ½₂ inch thick.

4. The payment card of claim 1, further comprising a magnetic strip located on the back surface of the payment card.

5. The payment card of claim 1, further comprising an EMV chip.

6. A payment card comprising:
   a rectangular front surface;
   a rectangular back surface opposite the rectangular front surface; and
   four edge walls extending between the rectangular front surface and the rectangular back surface, the four edge walls comprising a pair of length-side edge walls and a pair of width-side edge walls, the pair of length-side edge walls perpendicular to and extending along a length perimeter of the rectangular front surface and the rectangular back surface, and the pair of width-side edge walls perpendicular to and extending along a width perimeter of the rectangular front surface and the rectangular back surface, each of the pair of width-side edge walls connecting to each of the pair of length-side edge walls;
   wherein at least one of the edge walls includes an enhanced edge pattern extending along at least a portion of the at least one of the edge walls to improve a gripability of the payment card, wherein the enhanced edge pattern comprises a plurality of projections and a plurality of depressions extending along at least a portion of one or more of the edge walls.

7. The payment card of claim 6, wherein the plurality of projections and the plurality of depressions are regularly spaced along one or more of the edge walls.

8. The payment card of claim 6, wherein the plurality of projections and the plurality of depressions are irregularly spaced along one or more of the edge walls.

9. The payment card of claim 6, wherein the enhanced edge pattern comprises a reeded edge extending along at least a portion of one or more of the edge walls.

10. The payment card of claim 6, wherein the enhanced edge pattern comprises a crenelated edge extending along at least a portion of one or more of the edge walls.

11. The payment card of claim 6, wherein the enhanced edge pattern comprises one or more embossments and de-embossments along at least a portion of one or more of the edge walls.

12. The payment card of claim 6 further comprising:
    a first material located on a top side of the edge walls and a bottom side of the edge walls with a second material sandwiched between the first material on the top side and the bottom side, the second material different from the first material.

13. The payment card of claim 6, wherein the front surface and the back surface are approximately 3⅜ inches long and 2⅛ inches wide and ½₂ inch thick.

14. The payment card of claim 6, further comprising a magnetic strip located on the back surface of the payment card.

15. The payment card of claim 6, further comprising an EMV chip.

16. A payment card comprising:
    a front surface;
    a back surface opposite the front surface;
    a magnetic strip located on the back surface;
    four edge walls extending between the front surface and the back surface, the four edge walls comprising a pair of length-side edge walls and a pair of width-side edge walls, the pair of length-side edge walls perpendicular to and extending along a length perimeter of the front surface and the back surface, and the pair of width-side edge walls perpendicular to and extending along a width perimeter of the front surface and the back surface, each of the pair of width-side edge walls connecting to each of the pair of length-side edge walls; and
    four rounded corners each located between two of the edge walls;

wherein at least one of the edge walls comprises an enhanced edge pattern to improve a gripability of the payment card, the enhanced edge pattern comprises one or more of the following: a plurality of depressions, a reeded edge extending along at least a portion of one or more of the edge walls, a crenelated edge extending along at least a portion of one or more of the edge walls, or one or more embossments and de-embossments along at least a portion of one or more of the edge walls.

17. The payment card of claim 16, wherein the enhanced edge pattern comprises a first material and a second material different than the first material.

18. The payment card of claim 16, wherein the front surface and the back surface are approximately 3⅜ inches long and 2⅛ inches wide and 1/32 inch thick.

19. The payment card of claim 16, further comprising a magnetic strip located on the back surface of the payment card.

20. The payment card of claim 16, further comprising an EMV chip.

* * * * *